(12) United States Patent
Aeschlimann et al.

(10) Patent No.: US 7,815,409 B2
(45) Date of Patent: Oct. 19, 2010

(54) INTEGRAL JOINING

(75) Inventors: Marcel Aeschlimann, Ligerz (CH); Elmar Mock, Salvan (CH); Laurent Torriani, Lamboing (CH)

(73) Assignee: Woodwelding AG, Zug (CH)

( * ) Notice: Subject to any disclaimer, the term of this patent is extended or adjusted under 35 U.S.C. 154(b) by 1021 days.

(21) Appl. No.: 11/555,933

(22) Filed: Nov. 2, 2006

(65) Prior Publication Data

US 2007/0062628 A1 Mar. 22, 2007

Related U.S. Application Data

(60) Division of application No. 10/993,028, filed on Nov. 19, 2004, now Pat. No. 7,160,405, which is a continuation of application No. 10/018,625, filed on Mar. 7, 2002, now abandoned.

(60) Provisional application No. PCT/CH00/00328, filed on Jun. 16, 2000.

(30) Foreign Application Priority Data

Jun. 18, 1999 (CH) ................................ 1137/99

(51) Int. Cl.
  *F16B 15/00* (2006.01)
(52) U.S. Cl. .............................. 411/451.1; 411/451.45; 411/451.5; 411/452; 411/463; 411/464; 411/487; 411/908; 411/440; 411/441
(58) Field of Classification Search ......... 411/440–441, 411/451.1, 451.4, 451.5, 452, 463, 464, 487, 411/908; 219/98
See application file for complete search history.

(56) References Cited

U.S. PATENT DOCUMENTS

| | | | | | |
|---|---|---|---|---|---|
| 1,482,151 | A | * | 1/1924 | Rosenberg | ................. 411/453 |
| 1,686,468 | A | * | 10/1928 | Rosenberg | ................. 411/452 |
| 2,095,153 | A | * | 10/1937 | Rosenberg | ................. 411/453 |
| 2,401,967 | A | * | 6/1946 | Sandberg | ................... 238/366 |
| 2,642,242 | A | * | 6/1953 | Karitzky | ....................... 248/71 |
| 2,663,259 | A | * | 12/1953 | Catlin et al. | ................ 102/430 |
| 2,676,508 | A | * | 4/1954 | Erickson | ..................... 411/441 |
| 2,954,717 | A | * | 10/1960 | Henning et al. | ............. 411/440 |
| 3,106,791 | A | * | 10/1963 | Ball | ......................... 36/34 R |

(Continued)

FOREIGN PATENT DOCUMENTS

DE 2655086 6/1978

(Continued)

OTHER PUBLICATIONS

Schreiber Translations, Inc., translation of PCT document W098/42988, Oct. 1, 1998, PTO 2004-0781.

*Primary Examiner*—Victor Batson
*Assistant Examiner*—Roberta Delisle
(74) *Attorney, Agent, or Firm*—Rankin, Hill & Clark LLP (57) ABSTRACT

A method for joining bodies by melting down a joining element. The joining element acts on a surface of one of the bodies and penetrates the surface as a result of a directed force. Once in a penetrated condition, a mechanical excitation is generated such that during further penetration of the joining element into the one body, the advance is maintained through the directed force and the melting down is maintained through the mechanical excitation. Molten or melted material is hydraulically displaced into the bodies.

10 Claims, 5 Drawing Sheets

U.S. PATENT DOCUMENTS

| | | | |
|---|---|---|---|
| 3,184,353 A | | 5/1965 | Balamuth et al. |
| 3,203,105 A | * | 8/1965 | Whistler et al. ............... 33/578 |
| 3,261,115 A | * | 7/1966 | Manze ....................... 36/34 R |
| 3,276,820 A | * | 10/1966 | Ditson ........................ 299/100 |
| 3,330,177 A | * | 7/1967 | Oliver ........................ 411/424 |
| 3,480,306 A | * | 11/1969 | Yung .......................... 403/281 |
| 3,977,142 A | * | 8/1976 | Dove et al. .................... 52/363 |
| 4,032,803 A | | 6/1977 | Durr et al. |
| 4,130,751 A | | 12/1978 | Gordon |
| 4,248,232 A | | 2/1981 | Engelbrecht et al. |
| 4,482,795 A | | 11/1984 | Hinden |
| 5,004,422 A | | 4/1991 | Propper |
| 5,019,083 A | | 5/1991 | Klapper et al. |
| 5,092,727 A | * | 3/1992 | Moghe ....................... 411/411 |
| 5,163,960 A | | 11/1992 | Bonutti |
| 5,167,619 A | | 12/1992 | Wuchinich |
| 5,171,148 A | | 12/1992 | Wasserman et al. |
| 5,271,785 A | | 12/1993 | Devine |
| 5,292,216 A | * | 3/1994 | Van Allman ................ 411/441 |
| 5,413,578 A | | 5/1995 | Zahedi |
| 5,417,534 A | * | 5/1995 | Losada ....................... 411/441 |
| 5,426,341 A | | 6/1995 | Bory et al. |
| 5,452,975 A | * | 9/1995 | Grant .......................... 411/22 |
| 5,562,450 A | | 10/1996 | Gieloff et al. |
| 5,593,425 A | | 1/1997 | Bonutti et al. |
| 5,642,974 A | * | 7/1997 | Gabriel et al. ............. 411/453 |
| 5,709,823 A | | 1/1998 | Hahn |
| 5,735,875 A | | 4/1998 | Bonutti et al. |
| 5,741,104 A | * | 4/1998 | Lat et al. .................... 411/453 |
| 5,752,831 A | | 5/1998 | Padros-Fradera |
| 5,795,121 A | * | 8/1998 | Tucker et al. ............... 411/442 |
| 5,800,109 A | * | 9/1998 | Carruthers ................. 411/510 |
| 5,871,514 A | | 2/1999 | Wiklund et al. |
| 5,871,515 A | | 2/1999 | Wiklund et al. |
| 5,897,578 A | | 4/1999 | Wiklund et al. |
| 5,919,215 A | | 7/1999 | Wiklund et al. |
| 5,941,901 A | | 8/1999 | Egan |
| 5,964,764 A | | 10/1999 | West, Jr. et al. |
| 5,993,458 A | | 11/1999 | Vaitekunas et al. |
| 5,993,477 A | | 11/1999 | Vaitekunas et al. |
| 6,007,539 A | | 12/1999 | Kirsch et al. |
| 6,039,568 A | | 3/2000 | Hinds |
| 6,056,751 A | | 5/2000 | Fenton, Jr. |
| 6,059,817 A | | 5/2000 | Bonutti et al. |
| 6,068,482 A | | 5/2000 | Snow |
| 6,080,161 A | | 6/2000 | Eaves, III et al. |
| 6,099,313 A | | 8/2000 | Dorken et al. |
| 6,132,214 A | | 10/2000 | Suhonen et al. |
| 6,139,320 A | | 10/2000 | Hahn |
| 6,141,874 A | | 11/2000 | Olsen |
| 6,193,516 B1 | | 2/2001 | Story |
| 6,224,373 B1 | | 5/2001 | Lee et al. |
| 6,273,717 B1 | | 8/2001 | Hahn et al. |
| 6,332,885 B1 | | 12/2001 | Martella |
| 6,545,390 B1 | | 4/2003 | Hahn et al. |
| 6,592,609 B1 | | 7/2003 | Bonutti |
| 6,635,073 B2 | | 10/2003 | Bonutti |
| 2002/0044753 A1 | | 4/2002 | Nagayama et al. |
| 2002/0077662 A1 | | 6/2002 | Bonutti et al. |
| 2003/0118518 A1 | | 6/2003 | Hahn et al. |

FOREIGN PATENT DOCUMENTS

| | | |
|---|---|---|
| DE | 3723643 | 1/1989 |
| DE | 3919274 | 7/1990 |
| DE | 9012044 | 10/1990 |
| DE | 9012548 | 12/1990 |
| DE | 4100636 | 7/1992 |
| DE | 4209191 | 5/1993 |
| DE | 9317757 | 1/1994 |
| DE | 19644333 | 4/1998 |
| DE | 19735103 | 10/1998 |
| DE | 19916169 | 10/1999 |
| DE | 19916158 | 10/2000 |
| DE | 20113692 | 11/2001 |
| EP | 0268957 | 6/1988 |
| EP | 0451932 | 10/1991 |
| EP | 1044655 | 10/2000 |
| EP | 1044656 | 10/2000 |
| FR | 2455502 | 11/1980 |
| GB | 2061183 | 5/1981 |
| GB | 2324470 | 10/1998 |
| JP | 55121024 | 9/1980 |
| JP | 61104817 | 5/1986 |
| JP | 5245941 | 9/1993 |
| JP | 7300904 | 11/1995 |
| JP | 10323351 | 12/1998 |
| WO | 8803391 | 5/1988 |
| WO | 9103211 | 3/1991 |
| WO | 9427558 | 12/1994 |
| WO | 9601377 | 1/1996 |
| WO | 9637163 | 11/1996 |
| WO | 9842988 | 10/1998 |
| WO | 0238070 | 5/2002 |
| WO | 02087459 | 11/2002 |

* cited by examiner

INTEGRAL JOINING

CROSS-REFERENCE TO RELATED APPLICATION

The present application is a divisional application of U.S. Ser. No. 10/993,028, filed Nov. 19, 2004 and currently pending, which is a continuation of U.S. Ser. No. 10/018,625, filed Mar. 7, 2002 and currently abandoned, which is the national stage of PCT/CH00/00328, filed Jun. 16, 2000, and incorporates each of these prior applications by reference in their entireties.

BACKGROUND OF THE INVENTION

1. Field of the Invention

The present invention is generally directed toward methods and devices for joining bodies and, more specifically, toward a method and device for integrally joining several bodies with joining elements.

2. Description of Related Art

The economic joining of parts in industrial manufacturing is one of the main problems encountered. Especially porous material, such as wood, pressboard boards, porous stones or other materials are difficult to process. Apart from the conventional methods, which are based on mechanical fixing elements, other techniques are also known. Mentioned herein an exemplary manner for these shall be gluing together.

Thermal processes, which are based on the melting down of certain materials, are becoming more and more popular. In these processes, the surfaces to be joined are pressed together, e.g., under friction, so that either one of the base materials of the parts to be joined, or else a further material, is melted down due to the friction heat, as a result of which the parts are firmly joined together. The processes known today have various disadvantages. Mechanical joints, such as screws or nails, which primarily are based on frictional or positive locking engagement, in part call for very elaborate processing, they are subject to a high notch effect, they are easily torn out or else loosen over the course of time. Especially mentioned here shall be the problem of torn out or loosening fixing points in pieces of furniture made out of pressboard boards or similar materials. This has to be attributed to high stress concentrations and unfavorable load concentrations.

Nailing, which has been known from time immemorial, has a significant advantage: A nail can be processed easily and in a very short time and without requiring any additional preparation. The disadvantage, however, consists of the fact that also in the case of a nail the joint is one that is only based on frictional engagement and which, therefore, can only be subjected to a relatively small load. In addition, these joints, as the basis of the displacement of the base material, frequently lead to a cracking of the parts to be joined.

Integral joints with the materials in engagement, such as are produced, for example, by gluing, do not have the tendency, that the parts to be joined crack or split. They are characterized, however, by other disadvantages. These consist, for example in the long stoppage times, which are necessary when joining the parts, the low penetration depth of the adhesive into the parts to be joined or the difficult to control quantities of the adhesives (flowing away).

Thermal processes, which are based on the melting down of materials, with respect to an economical processing tangentially point in the right direction and they can roughly be divided into two groups. The first group consists in the method that, for example, the surfaces of two parts, one of which consists of a thermo-plastic plastic material, are pressed against one another and moved parallel (relative) to one another, so that friction heat is generated. The plastic material melted down by this frictional heat, after cooling down, forms an integral joint with material engagement between the two parts. This material engagement, however, is limited to the surface of the parts. The penetration depth of the material melted down and the application forces are always low, as a result of which these joints can only be subjected to very limited loads. A corresponding application is known, for example, from GB 2 061 183.

The second group of the thermal processes is based on the method that, for example, dowels or similar elements, typically made of meltable plastic material, are inserted into previously manufactured bores and are subsequently melted down by mechanical excitation and pressure. A corresponding method is known, for example, from PCT/EP95/02527. Significant in this is the fact that the parts to be joined for receiving the dowels imperatively have to be pre-drilled or pre-cleared before the dowels can be inserted into the bores and joined with the side walls at predefined points (certain zones at the end of the bore and along the dowel) by melting down. The thermal energy necessary for this is generated by radiation or by means of friction produced by ultrasonic excitation. Because of the necessary and precise pre-drilling, this is a process, which calls for several working steps.

PCT/CH98/00109 demonstrates a method for joining two bodies through a joining element. The joining element is inserted loosely into a bore. The joining element is subsequently partially made to melt down so that a superficial joint results.

From EP 0 268 957 a method for joining foils is known. In the case of this method, a sharpened joining element made of thermoplastic material is driven through a foil or plate after these have been brought to a partially plastic or ductile condition by heating. An embodiment illustrates a nail that is being driven into a non-thermoplastic substrate through a foil, which is in a partially plastic or ductile condition. The method is not suitable for joining larger parts.

SUMMARY OF THE INVENTION

An object of the present invention discussed is a method by means of which joints between bodies can be economically manufactured, wherein harmful stress concentrations are avoided and an optimum introduction of the load is achieved even in extremely porous materials.

In accordance with the present invention, a method for joining porous materials, resp., for the anchoring of load introduction points in porous materials and in other materials is provided. The joints produced by this method are based both on a material as well as on a positive locking engagement. Joining elements, in preference made out of a meltable plastic material, are pressed onto a surface such that they break through the material and penetrate into a zone of the body beneath the material surface. After reaching a defined load level and/or after reaching a certain penetration depth, the joining elements, while an external load is maintained, are mechanically excited, preferably by means of ultrasound, so that they partially melt down under controlled conditions. It goes without saying that mechanical excitation, for example, can also be achieved by means of rotation.

In further accordance with the present invention, the melting down as a general rule takes place within the cavity, which has been produced by the penetration of the joining element into the base material through the surface. Similar to a piston in a hydraulic cylinder, the not melted down part of the joining element is seated in the opening and fills the opening in the manner of a seal. Because the melted down material of the joining element cannot anymore escape from the cavity, on the basis of the external load, a high hydraulic pressure is generated. This pressure and the ultrasonic oscillations lead to the result that the molten material is pressed into the existing and/or newly formed cavities of the base material. In doing so, the penetration depth is dependent on the nature of the base material, the heat, the frequency, the amplitude, the driving-in speed (advance speed), the force acting on the joining element from outside, the geometry as well as on the material of the joining element. Through the meltable volume of the joining element, the quantity of material pressed into the base material can be determined. If a very large quantity of material should be necessary or if the size and the number of the cavities present in the base material are not known, then it is possible to utilize joining elements, which are continuously and endlessly fed in.

As a result of the mechanical pressing in of the joining element, a material compression of the base material results, which has an advantageous effect on the strength. Under normal circumstances, the stress peaks produced by the displaced and compressed material would lead to a cracking of the material. By the purpose-specific and matched application of ultrasound and external mechanical pressure, as well as by the designing of the joining elements according to the invention, however, the stresses produced are degraded and a destruction of the elements to be joined does not take place. Cavities and cracks produced nonetheless are immediately filled by the molten material. The invention disclosed here, for this reason for the first time makes it possible to anchor fixing elements in a single working step in materials and in particular in porous material such as wood, pressboard boards or cellular concrete and combinations of them with an in depth effect and without any pre-drilling. Through the controlled material compression in areas within the adjacent zones, the joining elements achieve a very strong retention even in very porous materials. As a result, very high mechanical tear-out forces are obtained. By the additional spatial penetration of the compressed anchoring zone and of the adjacent zones with the molten material of the joining element under high pressure underneath the surface of the material, the compressed material of the anchoring is additionally consolidated. An optimum distribution of the introduced loads and a degrading of harmful stress peaks are therefore assured. Thus, for example, for the first time it is possible to implement durable and load-resistant anchoring points for load introduction points even in pressboards equipped with a melamine layer without pre-drilling and in a single working step. By heat and pressure the wood is plastically deformed, the internal stresses are strongly reduced or equalized.

In contrast to prior art, the joining elements of the invention disclosed here do not only act in the surface zone of the elements to be joined, but preferably in their interior. Accordingly, a pre-drilling of all parts to be joined is not necessary, which has a positive effect in particular with respect to the economy of the process. It is further achieved that the anchoring points of the present invention, in contrast to those methods known from prior art, which call for a pre-drilling of the parts to be joined, are capable of being subjected to higher loads. Apart from this, the production of dust during the processing procedure is avoided either wholly or to a great extent. As a result of the deliberate reduction of stress peaks generated in the base material, it is possible even in very thin elements to anchor very thick joining elements without pre-drilling. Experiments have demonstrated, that, for example, a joining element in accordance with the invention, which has a thickness of approximately 8 mm, without any pre-drilling is capable of being anchored in the edge surface of a pressboard board with a thickness of approximately 20 mm. The anchoring of load introduction or joining points in porous materials, therefore, is dramatically rationalized.

In further accordance with the present invention, since a pre-drilling of the parts is not required anymore or, if required, is integrated in the same step, for example, in that the joining element serves for the pre-drilling operation prior to the melting down, first of all time is saved, secondly expensive machines can be made do without and thirdly the otherwise high demands with respect to precision of the pre-drilling are reduced. With the method demonstrated here, for this reason parts can be joined in a similarly simple manner, as, e.g., by means of nailing: After the parts to be joined have been placed on top of one another, they are firmly joined in a single working step by means of a material and a positive interlocking integral joint. In contrast to nailing, this joint, i.e., guarantees an optimum introduction of the forces into the parts to be joined.

The process according to the invention does not preclude, if so required, that one of the parts to be joined is pre-drilled. Pre-drilling will provide a guiding effect for the joining element. The joining of a pre-drilled part with a non-pre-drilled part represents a significant rationalization in comparison with methods according to prior art, because the high demands of the accuracy of two bores, which have to coincide exactly, do not have to be made anymore.

The advantageous excitation of the joining elements by means of ultrasound (or an equivalent means) creates a very high shear effect, particularly parallel to the main direction of joining, between the surfaces rubbed together. This, in turn, causes the materials destined to be melted down, which as a rule comprise thermoplastic plastic materials, to become liquid, by means of which a deep penetration into the parts to be joined is assured. This represents a significant advantage in comparison to the methods known from prior art, which, for example, are based on friction by rotation (friction welding) and which, therefore, have only a relatively low shear effect. In addition, during friction welding a movement vertical to the welding direction is generated, which as is known has a negative effect on the anchoring depth.

Advantageously, joining elements made of thermoplastic plastic materials are utilized. Thermoplastic plastic materials have a very high mechanical damping effect, which leads to an irreversible energy absorption. Because of the poor thermal conductivity of plastic materials, this energy absorption becomes noticeable in particular in the case of components, which are excited with a very high frequency (e.g., ultrasound), inasmuch as these melt down in an uncontrolled manner. Through an admixture of materials, which specifically control the mechanical damping, for the first time it is possible to avoid an uncontrolled melting down of the joining elements. In dependence of this, a higher mechanical load bearing capacity of the joining elements is obtained during the processing. In particular during the mechanical breaking through the covering layers, one is able to achieve an enhanced robustness, which also has a secondary effect on the subsequent mechanical load-bearing capacity of the joining elements. Particularly advantageous are materials, such as lime powder or wood dust, which have an isotropic characteristic, or other materials, such as reinforcing fibers, etc., which have an an-isotropic characteristic. Through the quantity of the additional material components, the characteristics of the joining elements can be specifically adjusted. The joining elements may also have a higher concentration of the additional material component in part or in zones. By means of this, the melting down zones can be controlled additionally.

The oscillation characteristics of the joining elements can be controlled by means of the frequency, the geometry, and the mass distribution as well as by the composition of the material. In order to achieve particularly great excursions of the joining elements, the frequency of the ultrasound is selected in such a manner, that the joining elements oscillate with their resonance or natural frequency. The oscillation characteristics and, in particular, the resonance characteristics are additionally optimized and assisted by the geometry. For example, through mass concentrations or density variations at suitable points it is achieved that the joining elements behave in a similar fashion to spring/mass pendulums with one or several springs and masses. By means of a purposeful an-isotropy of the materials of the joining elements it is achieved that the transmission of sound becomes dependent on the direction. Sound bridges obtained in this manner make it possible to guide the sound energy to certain locations and, if so required, to be concentrated. Possible sound bridges, for example, can be formed by means of fibers. Through a local change of the material composition, a mechanical damping, which represents a measure for the partial energy absorption of the material, can be influenced. This causes the joining elements to heat up only at discrete, predetermined points. This arrangement has a further significant advantage: In contrast to prior art, the joining elements are not heated up by the friction heat of two surfaces being rubbed together, but rather by an internal heating up. Joining elements with the characteristics mentioned above can be manufactured, for example, by the extrusion molding of fibers with a thermoplastic matrix, or by means of multi-component injection molding. It is in particular possible to equip corresponding joining elements with directional energy transmission, as is known from prior art.

By means of the ultrasound frequency and the geometry, the oscillation forms of the joining elements can be actively defined as well as the melting down characteristic influenced. If so required, for this reason it makes sense to control the penetration depth of the joining element in such a manner, that the melting zone, within which the joining element melts down, is situated at an optimum position below the surface of the base material. The optimum frequency is determined, for example, through a sensor that continuously determines the oscillating length of the joining element. For the generation of ultrasonic oscillations, a commercially available ultrasound welding appliance can be made use of. For an active controlling of the frequency, this appliance has to be modified.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
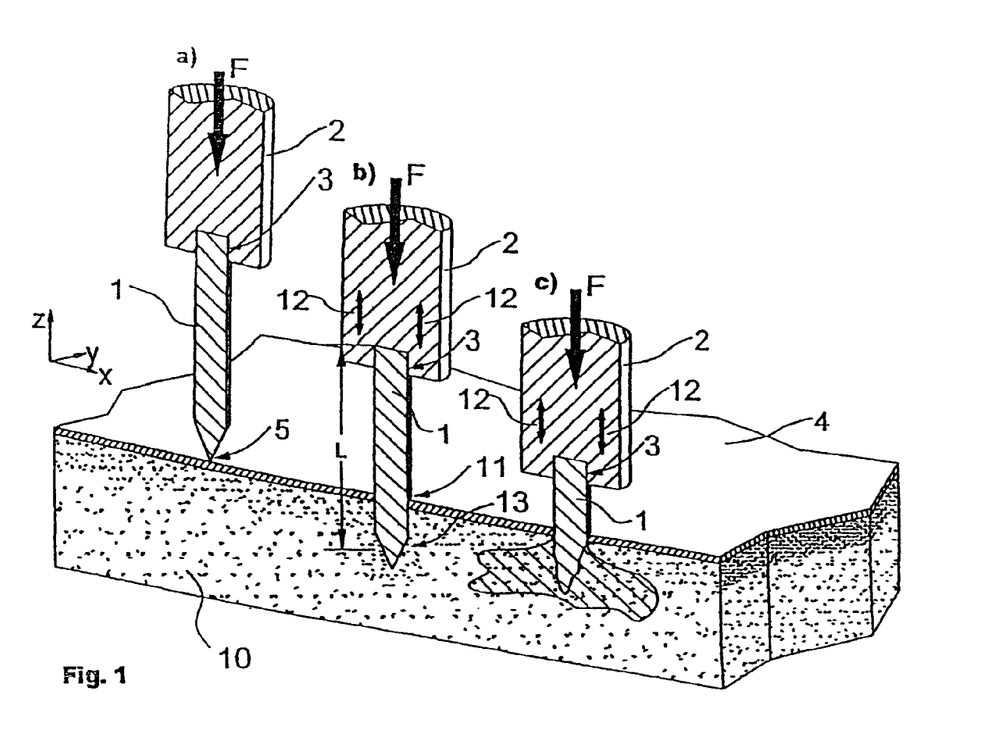
FIG. 1 shows the essential steps of the method in accordance with the present invention on the basis of a sectional view.

FIG. 1 schematically illustrates the essential steps of the method in accordance with the present invention in a sectional view. A joining element, which here has the shape of a longish dowel 1, is anchored in a porous base material 10, such as wood, pressboard boards or cellular concrete with a deep penetration action. Identifiable are a holder 2, advantageously made of metal, with an opening 3, which is suitable for the temporary retention of the dowel 1. The opening 3 is designed such that the dowel 1 is held within it and to a certain extent is guided by it, so that it does not fall out during the processing. Naturally, the dowel 1 can also be held by external means. It is advantageous in particular, that the opening and the coupling between dowel 1 and holder 2 is designed such that the dowel 1 does not begin to melt uncontrolled. An ultrasound generator (not illustrated in more detail) as well as a pressing device (not illustrated in more detail) is in an active connection with the holder 2. The pressing device serves to exert a force F on the dowel 1 through the holder 2.

In a first step, illustrated in FIG. 1a), the holder 2 together with the dowel 1 is placed above a surface 4 of the base material 10 such that one end of the dowel 1, here shaped like a point 5, comes to lie on the surface 4. Thereupon by means of the pressing device the force F is exerted. This causes the point 5 of the dowel 1 to break through the surface 4 of the base material 10 and penetrate into the base material 10. The base material 10, as a result of this, is compressed in this zone. After the point 5 of the dowel 1 has reached a certain depth of penetration (FIG. 1b) and/or the force F has reached a certain magnitude, the dowel 1 by means of the ultrasound generator in active connection with the holder 2 is put into oscillation, here in the direction of the z-axis. This process is indicated by means of arrows 12. In doing so, the frequency is matched to the geometry of the dowel 1, in particular to its length, material composition and mass distribution. This causes the dowel 1, here in the area of a predefined zone 13 below the surface 4, melts down. As is made clear by FIG. 1b), the dowel 1 is seated in the opening 11 in the manner of a plug and like a seal fills out this opening in a similar fashion to a piston in a hydraulic cylinder. The melted down material of the dowel 1 cannot escape and is under a high pressure because of the force F acting on the dowel 1. This has the effect that the melted down material of the dowel 1 is pressed into the base material 10 so that any cavities present are filled (FIG. 1c). The ultrasonic oscillations and the fusion heat generated have an assisting effect.

The embodiment illustrated here concerns a continuous melting down of the dowel 1 in the zone 13. By the continued feeding-in of the dowel 1 through the opening 11 into the zone 13 and the force F it is achieved, that the pressure below the surface is maintained. The melting zone 13 is influenced by the oscillation frequency and the other process parameters. A length L of the dowel 1 plays a certain role here because it is associated with the oscillation characteristics. On the basis of the melting down in the zone 13 and the continued feeding-in of the dowel 1 through the opening 11, the length L of the dowel 1 changes. For this reason, if so required, the other process parameters are monitored in function of the changing values, such as, for example, the length L, and if so required changed during the process. The length L is therefore measured with a sensor (not illustrated in more detail) and utilized as a control parameter for the ultrasound frequency. By means of this, an optimum melting down of the dowel 1 is achieved.

Figure 2:
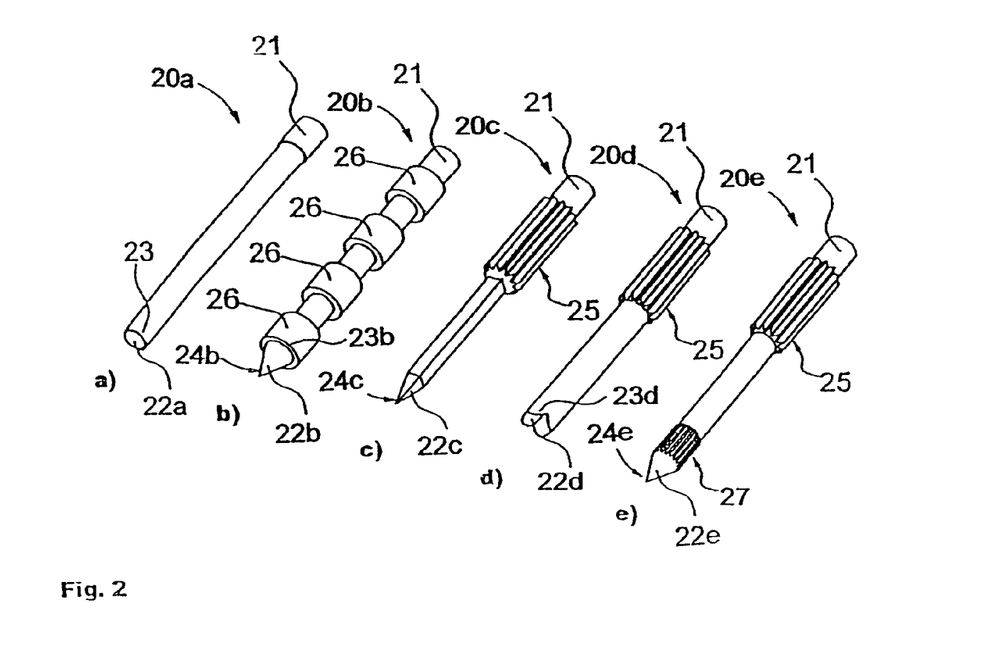
FIG. 2 shows various embodiments of joining elements.

FIG. 2 in an exemplary fashion illustrates six different embodiments of joining elements, namely joining elements 20a, 20b, 20c, 20d, 20e. The individual embodiments are suitable for different applications and materials. Naturally, the joining element design can differ substantially from the forms illustrated here. In order to take into account the differing materials and fields of application, the various joining elements are purposefully adapted. The joining elements depicted here as a rule during the processing are held and controlled at one end 21 in a holder (not illustrated in more detail). The optimum joining element material composition varies from application to application and is therefore adapted. In order to influence the mechanical damping, the joining elements 20a, 20b, 20c, 20d, 20e contain additional materials, such as, e.g., lime powder or reinforcing fibers.

These, in part, additionally have a positive effect during processing, so that higher loads or more slender and longer joining elements can be implemented. The design of the ends 22a, 22b, 22c, 22d, 22e is important for the characteristics of the joining elements 20a, 20b, 20c, 20d, 20e and it also determines the subsequent material distribution in the base material. These designs therefore are in particular matched to the base materials. Flatter designs of the ends 22a, 22d (refer to FIGS. 2a and 2d) have a greater tendency to push material in front of them and thus to form a strongly compressed zone in front of the joining elements 20a, 20d. This, for its part, supports a lateral distribution of the melted material. Sharp edges 23b, 23d and points 24b, 24c, 24e enhance the cutting effect of the joining elements 20b, 20c, 20d, 20e during the penetration of the covering layer 4 of a base material 10 (refer to FIG. 1). Apart from this, the shape of the joining elements also has an influence on the melting characteristics of the joining elements 20a, 20b, 20c, 20d, 20e. Elements providing a direction for the energy, here in the shape of ribs 25, 27 running parallel to the longitudinal axis of the joining element 20c, 20d, 20e, in the case of a mechanical excitation, e.g., by means of ultrasound, lead to concentrations, which promote a local melting down. Through local material concentrations, e.g., through enlargements 26, the oscillation characteristics of the joining element are influenced. In this sense it is also possible to implement the mass concentrations inside the joining elements 20a, 20b, 20c, 20d, 20e.

Figure 3:
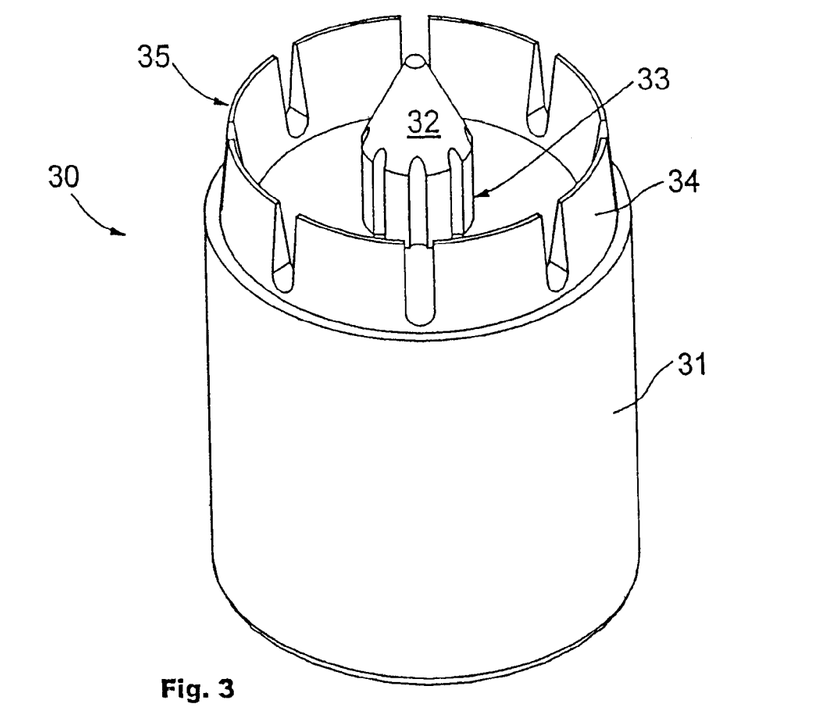
FIG. 3 shows a further embodiment of a joining element.

FIG. 3 illustrates a further embodiment of a joining element 30 comprising a cylindrical part 31, and a pointed element 32, which is centrally positioned here. This element is equipped with ribs 33 and serves for penetrating a surface (refer to FIG. 4). Elements arranged in a circular manner 34 also serve for pushing through a surface (refer to FIG. 4). The elements 34 have edges 35, which have a certain cutting effect. The joining element, for example, is a component part of a hinge or, for example, serves for fixing a hinge (not illustrated in more detail) or of another load introduction point in the case of furniture or of other bodies made of pressboard elements or similar materials or else it may comprise additional functions itself. It may also serve in particular for the receiving of further elements, for example, screws, etc. An anchoring in porous materials, such as wood, cellular concrete or similar materials, such as concrete or plastic materials is particularly advantageous. In this, the pre-drilling of the surfaces to be joined is not necessary. The joining element 30 consists of a thermo-plastic plastic material. This is equipped with additional filler materials, which influence the internal mechanical damping. By means of this, the melting down characteristics are controlled and influenced. The joining element advantageously is manufactured by injection molding.

Through the processing of several components it is achieved that a grading with the joining element 30 results, which is matched to the base materials to be joined. In order to make possible the processing of difficult materials, the elements 32 and 34 can also be designed such that a secondary movement enhances their cutting effect. They can be designed such that, for example, by means of a rotation, the base material is broken open in support. The joining element 30 in doing so is advantageously designed so that it does not melt down as a consequence of the secondary movement.

Figure 4:
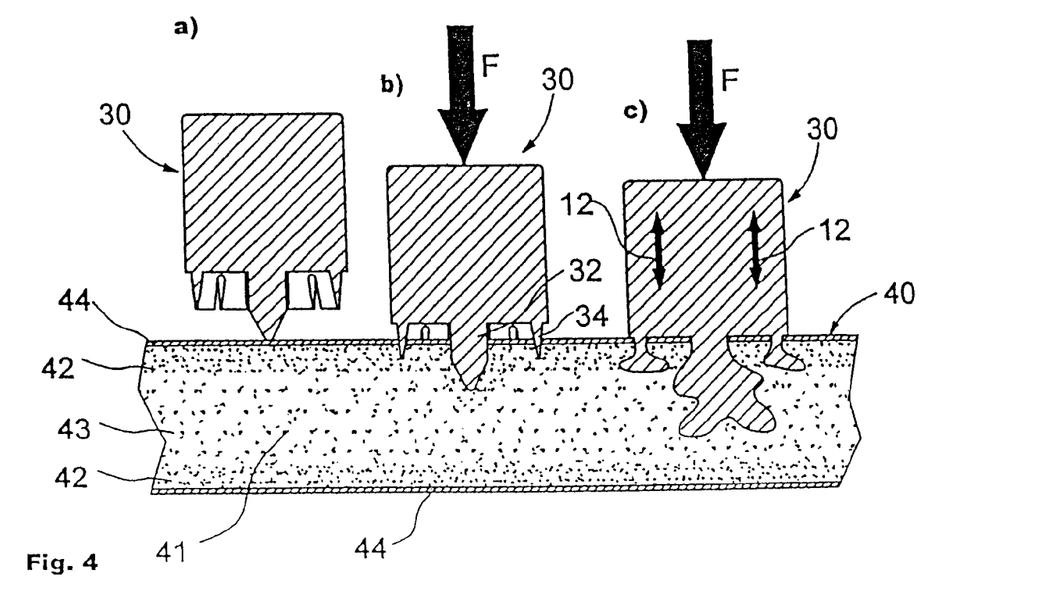
FIG. 4 shows the essential steps of the method using the joining element according to FIG. 2.

FIG. 4 schematically illustrates the processing of a joining element 30 in accordance with FIG. 3 in three steps in a sectional view. It goes without saying, that only the principle is illustrated here. Of course, the joining element 30 may also have a different geometry or may be connected with other elements, such as, for example, braces or small garnishings, other fixing elements or hinges. In a first step, joining element 30 (FIG. 4a) is brought above a surface 40 of a base material 41. The base material here comprises a porous material, which at its edge zones 42 has a higher density than in its core zone (it goes without saying, that also such materials can be processed, which have a constant thickness). Covering layers 44 form an external finish of the base material. The joining element 30 positioned above the surface 40 is pressed onto the surface 30 with a force F (FIG. 4b) such that the elements 32 and 34 break through it and penetrate into the base material 41 to a certain depth. The depth of penetration in this is, i.e., dependent on the base material 41, the design of the elements 32 and 34 and on the force F. A secondary movement, for example, in the form of a rotation, may assist the penetration of the joining element 30. After a certain depth of penetration has been reached, the joining element 30, by means of ultrasound, is mechanically excited, as is schematically illustrated by means of arrows 12. In doing so, the mechanical excitation advantageously takes place vertically to the surface 40. As a result of friction and/or internal mechanical damping, a heating up of the joining element 30 takes place. This causes the elements 32 and 34 to melt down beneath the surface 40 in a controlled manner. As a result of the force F, the joining element 30 sinks in more, so that material is continuously melted and pressed into the base material 41 under high pressure. The melted down material of the joining element 30 fills in any cavities present, by means of which the base material 42 is additionally consolidated. Through the ultrasonic oscillations, the heat and the pressure, the base material 42 is compressed and consolidated; in addition it is achieved, that the joining element 30 penetrates more easily. The anchoring of the joining element 30 in the base material 41 is schematically illustrated in FIG. 4c).

Figure 5:
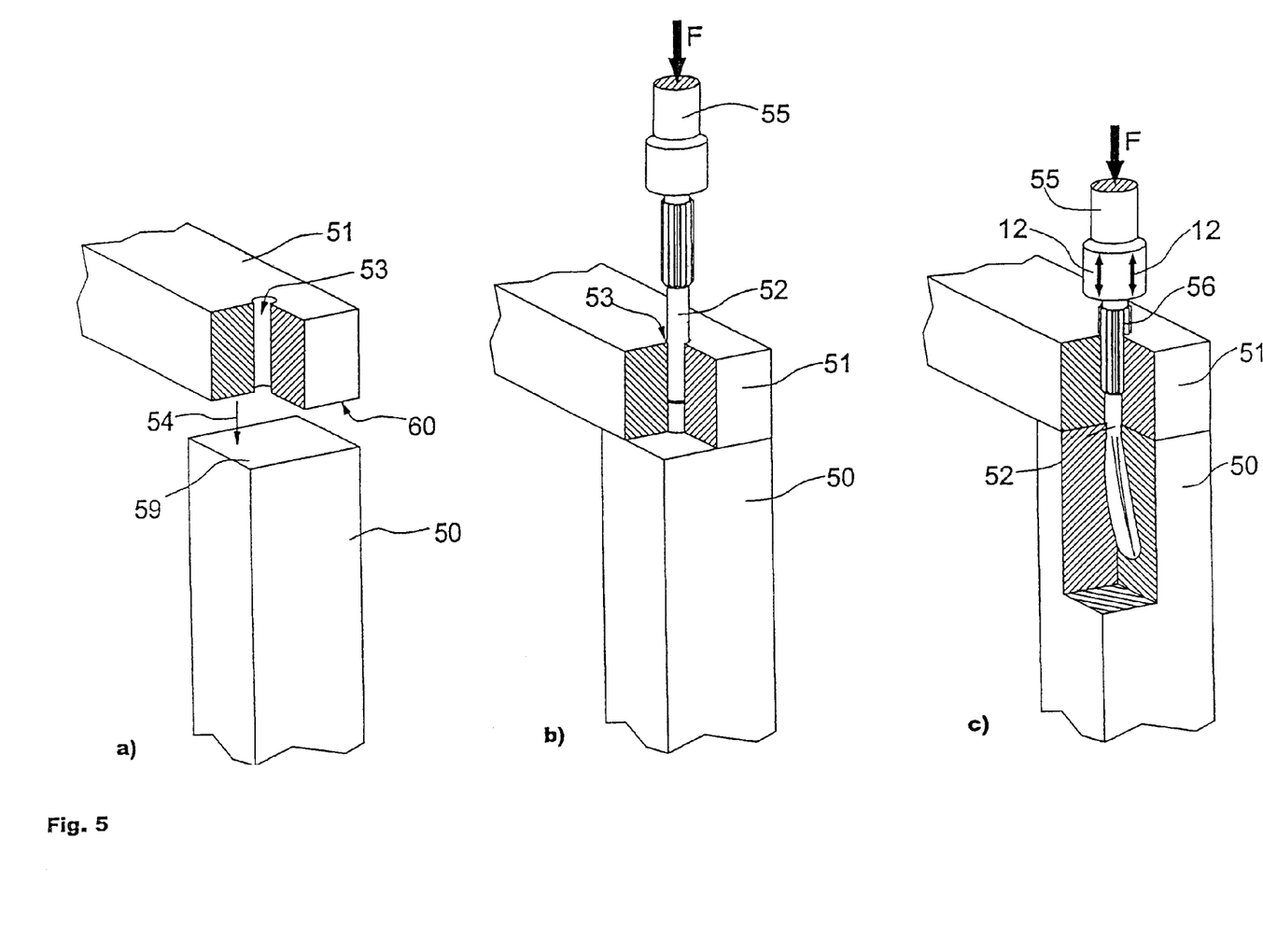
FIG. 5 shows how two parts are joined.

FIG. 5 schematically illustrates the joining of two bodies 50, 51, for example, made of wood, by means of a longish joining element 52. The body 51 here is equipped with a bore 53, which, however, is not absolutely necessary. The two bodies 50 and 51 in a first step are placed one above the other (FIG. 5a), which is made clearer by an arrow 54, and anchored in their final position. The joining element 52 thereupon is inserted into the bore 53 (FIG. 5b). By means of a pressing head 55, which is in active connection with a pressing device (not illustrated in more detail) and an ultrasound generator (not illustrated in more detail), a force F is exerted on the joining element 52 so that it is pushed into the surface of the body 50. After the force F and/or the depth of penetration have reached a certain predetermined value, the joining element 52 is mechanically excited (indicated by the arrows 12) by means of the ultrasound generator (not illustrated in more detail). As a result of this, the joining element 52 begins to melt down under control and to penetrate into the body 50

(FIG. 5c). In doing so, the material of the body 50 is purposefully compressed and any cavities present are interspersed with the material of the joining element 52. Ribs 56 or other elements with a similar effect on the joining element 52 lead to the result that, after the joining element 52 has reached a certain depth of penetration in the body 50, a joining takes place between the body 51 and the joining element 52. After the joining element 52 has reached the desired depth, a firm connection between the two bodies 50 and 51 results. Because of the fact that a pre-drilling of both bodies is not required, the joining is able to take place in a single work step in a most economical manner. If so required, the joining element 52 can be equipped with additional elements on its surface. These lead to the result that through a secondary movement of the joining element 52 (for example, a rotation around the longitudinal axis) under the force F an easier penetration taking into account a certain chip formation takes place. This secondary movement, however, does not lead to an uncontrolled melting down of the joining element 52. In order to assist the joining between the two bodies 50 and 51 or in order to achieve a certain sealing effect, it is advantageous to equip the surfaces 59 and 60 with a layer of meltable material. This layer, however, may also be put in place additionally. Through the ultrasonic oscillations applied through the joining element 52 or else directly, it is achieved, that this layer due to friction and/or internal mechanical damping melts. As a result of this, the joint between the two bodies 50 and 51 is additionally assisted and sealed by the joining element 52. The method demonstrated here is particularly suitable, for example, for the joining of window frames or similar elements. In this respect, it is possible for the first time to join very thin, slender bodies without any precise pre-drilling such that a maximum mechanical load bearing capacity is obtained.

Figure 6:
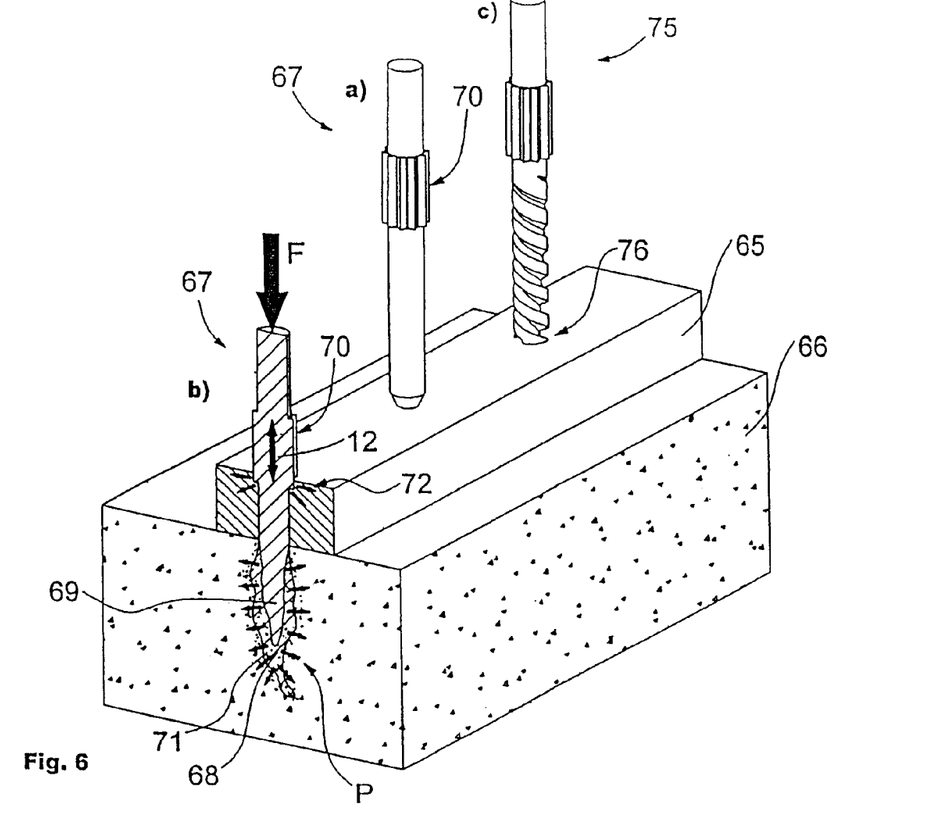
FIG. 6 shows how two further parts are joined.

With regard to FIG. 6, FIG. 6a) illustrates a first body 65, a second body 66 and a joining element 67. The first body 65 here is a beam made of wood and the second body 66 brickwork, for example, cellular concrete. The joining element 67 comprises a thermo-plastic material and, if so required, an additive, which regulates the internal mechanical damping of the thermoplastic material. FIG. 6b) depicts the joining element 67 and the bodies 65 and 66 in a sectional view during the processing procedure. In the condition illustrated here, which is a snapshot, the joining element 67 has pushed through the first body 65 and is penetrating into the second body 66. A force F is acting on the joining element 67. Simultaneously, the joining element 67 is mechanically excited through ultrasound in the direction of its longitudinal axis, indicated by an arrow 12. As a result, this element melts down in a controlled manner in the interior of the second body 66 in the area of a zone 68. In order to achieve an assisting guiding effect on the joining element 67, it is possible to pre-drill the first body 66. A core zone 69 of the joining element 67 initially remains solid during the melting-down process, which, among others, leads to the result that the base material of the second body 66 within a zone 71 is compressed under control and without producing any harmful stresses. Through the force F, the joining element 67 is continuously fed in, so that the material of the joining element 67 melted down in the zone 68 is under a hydraulic pressure, which is indicated with arrows P and is pressed into the interior of the second body 66. As a result of this and through the mechanical excitation by means of ultrasound, harmful stresses in the base material of the second body 66 are purposefully reduced. The joining element 67 here comprises certain elements 70 that provide a direction for the energy (FIG. 6a), which after a certain depth of penetration has been reached lead to the result that the joining element 67 partially melts down in the zone of the first body 65 and is joined with it by material engagement. This is schematically made clearer by means of arrows 72. After the cooling down of the material melted down, the joining element 67 is joined with the bodies 65 and 66 by material engagement and a positive form fit, which results in mechanical joints with a very high load-bearing capacity. In order to seal-off the contact surfaces between the first body 65 and the second body 66 against ambient influences, the contact surfaces can be provided with a thermally melting varnish or another coating, which melts during the mechanical excitation through ultrasound. Achieved by this is the result that the contact surfaces are additionally provided with a sealing joint. FIG. 6c) illustrates a further embodiment of a joining element 75, which is suitable for joining the bodies 65 and 66. In contrast to the joining element 67 (FIG. 6a), the joining element 75 has certain similarities with a drill. At one end 76 the joining element 75 has a design that assists a partial penetration by the superimposition of a secondary movement into at least one of the bodies 65 and 66. This secondary movement, for example, may be implemented by a rotation around a longitudinal axis, which, however, does not lead to the uncontrolled melting down of the joining element 75. After a certain depth of penetration into one of the parts has been achieved, the joining element 75 is handled in the same manner as the joining element 67 (FIGS. 6a and 6b).

Figure 7:
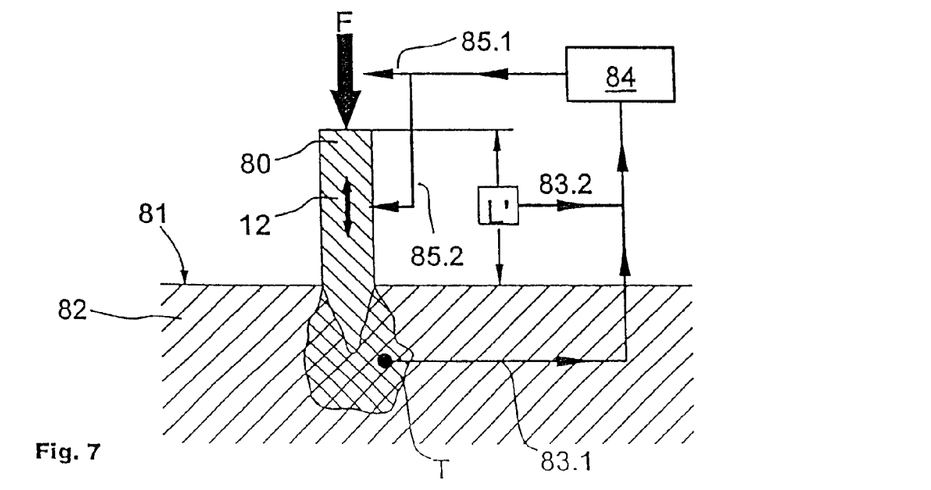
FIG. 7 shows how a joining element is processed under control.

FIG. 7 schematically illustrates a possibility for the optimum controlling of the method in accordance with the invention, in the case of which a joining element 80 penetrates into a surface 81 of a body 82. The measured values relevant for the processing procedure are, i.e., the free length L' of the joining element 80 and the temperature T of the material melted down and the ambient temperature. These are decisively determined by the magnitude of the force F, the energy of the ultrasonic oscillations (frequency, amplitude), indicated by an arrow 12, and by the advance speed with which the joining element 80 penetrates into the surface 81. In order to assure an optimum processing of the joining element 80, these values are monitored during the process and are utilized for the establishment of the required adjustable variables. The determination of the temperature T, in preference indirectly, and of the free length L' is schematically indicated by the arrows 83.1 and 83.2. The adjustable variables are established with a suitable process computer 84 and are utilized for controlling the force F (arrow 85.1), the advance speed (not illustrated in more detail) of the joining element 80, the ultrasonic frequency and amplitude (arrow 85.2). Achieved as result of this is an optimum, effective in-depth joining between the joining element 80 and the body 82.

Figure 8:
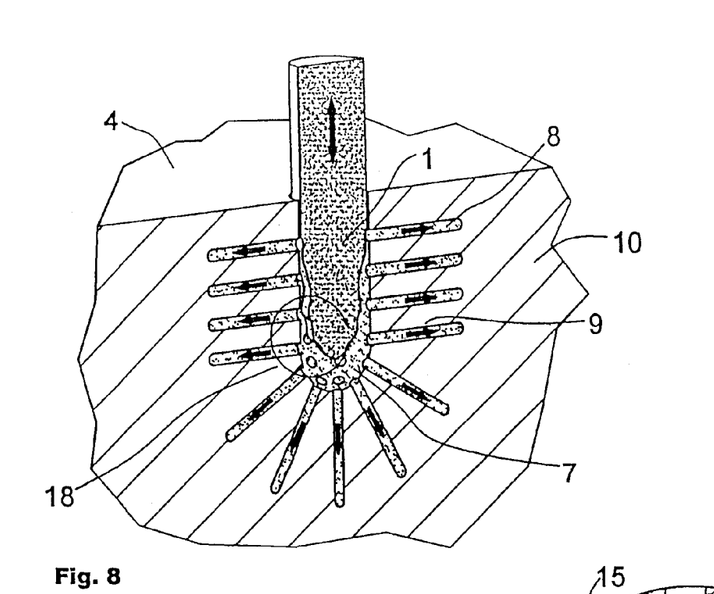
FIG. 8 shows schematically a cross section through a body.
Figures 9, 10:
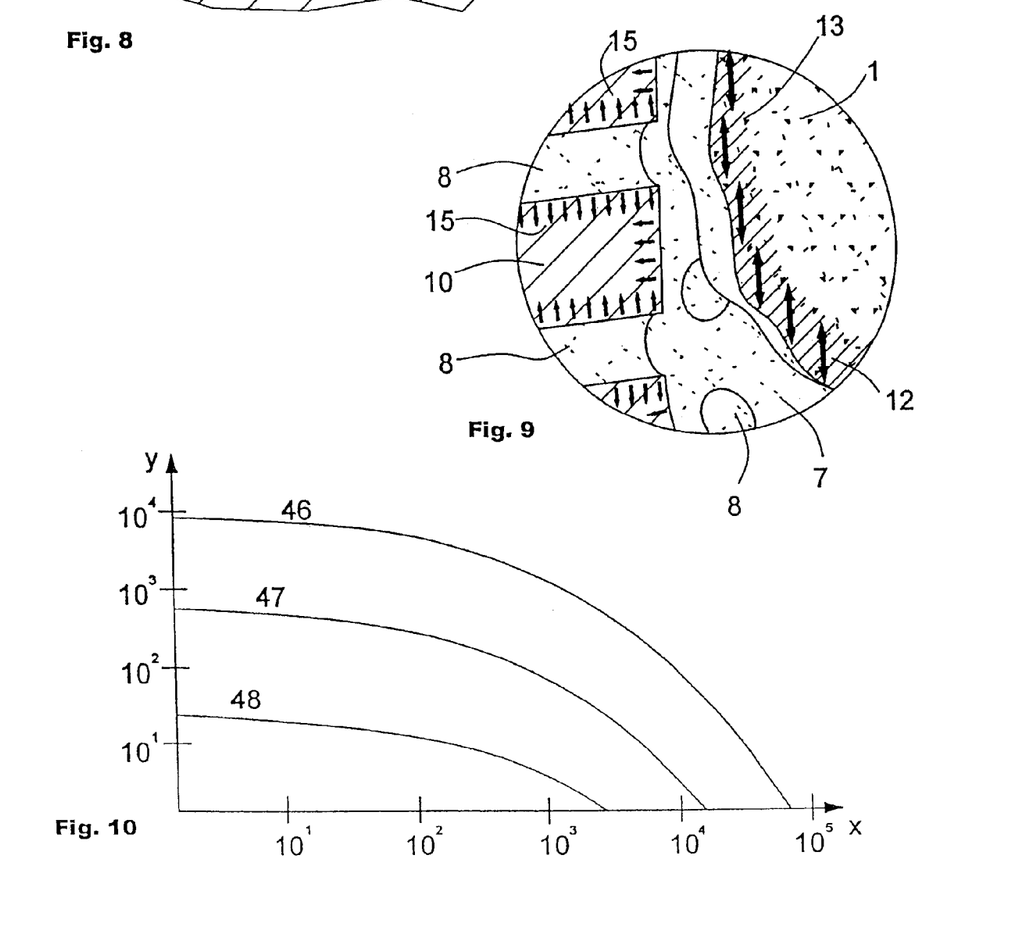
FIG. 9 shows a section of FIG. 8.
FIG. 10 illustrates a diagram.

FIG. 8 schematically and strongly simplified illustrates the hydraulic operating mode of the invention on the basis of a perspective sectional view. Identifiable are a joining element 1, which has penetrated into a body 6 through a surface 4. In the interior of the body 6 there is a cavity 7, which is linked with thin channels or capillaries 8 and which is closed by the joining element 1. The channels 8 and the cavity 7 are filled with melted down material 14. Longitudinal waves from an ultrasound generator (not illustrated in more detail) are coupled into the joining element 1 with positive engagement or positive fit. Through strong non-homogeneities in the stress distribution, with maximum stress concentrations in those zones, in which a joint is to be obtained, heat is generated through the transformation of mechanical energy. The heat is typically produced through loss, e.g., mechanical hysteresis (hysteresis losses) or, friction. Through the impingement of the joining element 1 onto a non-homogeneous or porous surface, in the microscopic range of the joining element 1 a high internal shear effect is produced (FIG. 9). This shear effect, in conjunction with the temperature increase, produces the effect that the material of the joining element 1 melts down, wherein a very strong decrease of the viscosity of the molten material takes place. Through the application of ultrasound in accordance with the present invention, it is possible to produce, very specifically and within an optimum zone, low viscosity molten material, which under hydraulic pressure penetrates into the finest pores, cracks and capillary voids (arrows 9). The molten material typically is anisotropic, therefore has direction-dependent characteristics. In particular during the application of ultrasound it can be observed, that the viscosity of the molten material, this in contrast to other methods known from prior art, is capable of being reduced by several tens of percent. This strong liquefaction together with the hydraulic pressure, which is achieved by pressing the joining element 1 into the cavity 7, causes the molten material to penetrate right into the microscopic range of the pore structure of the joining material. In doing so, the molten material of the joining element 1 in essence follows the orientation of the base material 10 and consolidates and reinforces it. As the result, a composite-like compound with a fluid transition from the base material 10 to the joining element 1 is produced, with a purposefully created consolidation in the zone around the cavity 7 and a solid, homogeneous core. Corresponding compounds are far superior to the conventional joining methods known from prior art, particularly with respect to mechanical strength properties. A section from FIG. 8 is depicted in FIG. 9 in an enlarged view.

FIG. 9 in an enlarged view illustrates a section 18 of the model-like view from FIG. 8. Identifiable are the joining element 1, the cavity 7 and channels 8, which extend into the base material 10. The melted down material 14 fills out the cavity 7 and the channels 8 and is under hydraulic pressure, which is indicated by arrows 15. Through the mechanical excitation of the joining element 1 by means of ultrasound, a melting zone 13 is formed, in which material as a result of the high shear effect is heated up and melted down. Arrows 12 schematically illustrate the movement of the joining element 1 due to the mechanical excitation and the shear effect produced thereby. Through the high hydraulic pressure, which results from pressing the joining element 1 into the cavity 7, the molten material is displaced, i.a., into the cavities 8. Between the molten material, the displaced material and the material being continuously fed in from outside, an equilibrium is established, so that a continuous process automatically results.

FIG. 10 on the basis of three curves 46, 47, 48 illustrates a typical connection between the shear effect (x-axis) and the viscosity (y-axis) of a thermoplastic plastic material, such as is utilized, for example, for a joining element 1. The three curves 46, 47, 48 depict the characteristics at different temperatures. The curve 46 shows the characteristics at a lower temperature, the curve 47 at a higher temperature and the curve 48 at the highest temperature. It is identifiable, that with increasing shear effect (x-axis) and temperature the viscosity (y-axis) decreases. In other words, the plastic material becomes more fluid at higher temperature and with greater shear effects. In the case of the invention under discussion here this signifies, that by increasing the mechanical excitation by means of ultrasound via the frequency and the amplitude an influence is brought to bear on the characteristics of the melting material. Because as a rule no external thermal energy source is utilized, the temperature inside the cavity 7 (refer to FIGS. 8 and 9) is produced as a result of the mechanical parameters and the thermal conductivity of the ambient. The process is adjusted such that the ambient and the material of the joining element manifest an optimum characteristic and that no uncontrolled melting down of the joining element 1 takes place.

What is claimed is:

1. A joining element suitable for being forced through a surface of an object comprising a porous material and for being anchored in the porous material with the aid of a directed force and mechanical oscillation, the joining element comprising:
    a first end portion comprising a thermoplastic material,
    a second end portion,
    a body arranged between said first and second end portions, and
    an axis extending between said first and second end portions,
    wherein said first end portion is shaped for penetrating the surface and
    wherein said body comprises at least two substantially cylindrical body portions which are arranged co-axially and have differing cross sections, wherein a first body portion adjoining the first end portion has a smaller cross section than a second body portion adjoining the first body portion via a shoulder and wherein at least one sharp-ended element spaced from the first body portion and directed toward the first end portion is arranged around the first body portion on said shoulder.

2. The joining element according to claim 1, wherein said body portions have round or polygonal cross sections.

3. The joining element according to claim 1, wherein at least one of said body portions comprises axially extending or spiral ribs.

4. The joining element according to claim 1, wherein said first end portion comprises a sharp point or edge.

5. The joining element according to claim 1, wherein the thermoplastic material comprises a filler.

6. The joining element according to claim 5, wherein the filler is selected from the group consisting of lime powder, fibers, wood dust and ceramic materials.

7. The joining element according to claim 5, wherein first zones of the joining element have relatively higher filler contents than second zones.

8. The joining element according to claim 1, wherein said second end portion is equipped for attaching a further object to the joining element.

9. The joining element according to claim 1, comprising a plurality of sharp-ended elements arranged in a ring around and spaced from the first body portion on said shoulder.

10. The joining element according to claim 1, wherein a sharp end of the at least one sharp-ended element is an edge of the sharp-ended element.

* * * * *

UNITED STATES PATENT AND TRADEMARK OFFICE
CERTIFICATE OF CORRECTION

Page 1 of 1

PATENT NO. : 7,815,409 B2
APPLICATION NO. : 11/555933
DATED : October 19, 2010
INVENTOR(S) : Marcel Aeschlimann et al.

It is certified that error appears in the above-identified patent and that said Letters Patent is hereby corrected as shown below:

On the title page delete

"(60) Division of application No. 10/993,028, filed on Nov. 19, 2004, now Pat. No. 7,160,405 which is a continuation of application No. 10/018,625, filed on Mar. 7, 2002, now abandoned.

(60) Provisional application No. PCT/CH00/00328, filed on Jun. 16, 2000."

Insert

--(60) Division of application No. 10/993,028 filed on Nov. 19, 2004, now Pat. No. 7,160,405, which is a continuation of application No. 10/018,625, filed on Mar. 7, 2002, now abandoned, which is a national stage filing of application No. PCT/CH00/00328, filed on Jun. 16, 2000.--

Signed and Sealed this
Thirteenth Day of September, 2011

David J. Kappos
*Director of the United States Patent and Trademark Office*